(12) United States Patent
Tong et al.

(10) Patent No.: US 8,613,559 B2
(45) Date of Patent: Dec. 24, 2013

(54) UNIVERSAL SERIAL BUS CONNECTOR

(75) Inventors: Tak Kit Tong, Hong Kong (CN); Wai Hung, Hong Kong (CN); Guillen Gamboa, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 330 days.

(21) Appl. No.: 13/064,555

(22) Filed: Mar. 30, 2011

(65) Prior Publication Data

US 2011/0243511 A1  Oct. 6, 2011

Related U.S. Application Data

(60) Provisional application No. 61/282,791, filed on Mar. 31, 2010.

(51) Int. Cl.
*G02B 6/36* (2006.01)
*H04B 10/00* (2013.01)

(52) U.S. Cl.
USPC .............................................. 385/77; 398/139

(58) Field of Classification Search
None
See application file for complete search history.

(56) References Cited

U.S. PATENT DOCUMENTS 8,328,434 B2 * 12/2012 Wang et al. ...................... 385/89

* cited by examiner

*Primary Examiner* — Jerry Rahll
(74) *Attorney, Agent, or Firm* — Nixon & Vanderhye PC

(57) ABSTRACT

A USB connector comprises a USB connector body and an optical module including an optical transmitter and an optical receiver engaging with the USB connector body. The USB connector body comprises a metal shell having a first opening adapted for connecting with an external plug; a second opening communicating with the first opening and adapted for accommodating the optical module; and a locking device adapted for locking the optical module within the USB connector body. The present invention can serve as an active optical transceiver, and simplify the structure and reduce manufacturing cost, further reduce the loss of optical signals and, in turn improve the transmission performance.

18 Claims, 8 Drawing Sheets

UNIVERSAL SERIAL BUS CONNECTOR

This application claims the benefit of provisional application No. 61/282,791, filed on Mar. 31, 2010, the entire content of which is hereby incorporated by reference in this application.

FIELD OF THE INVENTION

The present invention relates to a universal serial bus (USB) connector which is also adapted to be used as an optical signal input terminal for receiving an optical signal or an optical signal output terminal for outputting an optical signal and, more particularly, to a USB connector which encapsulates high-speed active optical components and precision optics to enable low-cost and high-speed optical transmission through the connector.

BACKGROUND OF THE INVENTION

Conventionally, optical fiber is used for high-speed data transmission at low costs. Optical transceiver is used to convert electrical signal to optical signal and vise versa. Traditionally, coupling of optical signal from optical transceiver to optical fiber requires dedicated high-precision optical connectors. Recently, there is a need to introduce optical data bus to consumer electronic appliances to cope with the ever-increasing bandwidth demands for, e.g., transferring multimedia content from storage to the appliances. The enable this kind of applications, USB connector interfaces, which are commonly found in computers and numerous consumer appliances, were adopted to facilitate optical transmission.

In the traditional implementation of this type of optical interface, optical transceivers are located in transceiver housings outside of the USB connectors and on a printed-circuit board within the appliance enclosure. High-speed electronic signal is fed into the transceiver through the housing and is converted to optical signal. The optical signal is first coupled into a short piece of fiber jumper which is attached to the transceiver optical port during assembly process. The other end of the jumper is terminated with a plug assembly adopted for assembling into the back of USB connector. External fiber cable is terminated with a receptacle assembly which takes the shape of USB plug and can be inserted into the USB connector and aligned with the jumper plug assembly within the USB connector housing. When the plug and receptacle are engaged, optical signal is coupled from the jumper cable into the external cable and vise versa. Thus a duplex optical link is formed.

With the structure of the above-mentioned optical link configuration, the optical transceiver and corresponding housing occupies real estate on the PCB within the appliance. In addition, the use of additional jumper cable to connect optical transceiver and external cable causes optical loss and may affect signal transmission quality. As a result, there is a need to provide an improved USB connector design which can simultaneously serve as an active optical transceiver to overcome the disadvantages mentioned above.

SUMMARY OF THE INVENTION

One aspect of the present invention is to provide a USB connector, which can serve as an active optical transceiver, and simplify the structure and reduce manufacturing cost, further reduce the loss of optical signals and, in turn improve the transmission performance.

To achieve above objective, an USB connector comprises a USB connector body and an optical module including an optical transmitter and an optical receiver, and engaging with the USB connector body. The USB connector body comprises a metal shell having a first opening adapted for connecting with an external plug; a second opening communicating with the first opening and adapted for accommodating the optical module; and a locking device adapted for locking the optical module within the USB connector body.

Preferably, the USB connector body further comprises an insulation body and a plurality of conductive terminals formed within the metal shell. These terminals are used for regular USB functionalities. The metal shell further comprises an upper wall, two side walls and a bottom wall.

As one embodiment, the first opening is formed at a front portion of the metal shell, and the second opening opposite to the first opening is formed at a rear portion of the metal shell.

As another embodiment, the metal shell further comprises a rear wall, the first opening is formed at a front portion of the metal shell, and the second opening is formed at the upper wall and at least partially extends to the rear wall.

Preferably, the locking device comprises at least one snap-locking mechanism formed at a position of the upper wall which is near the rear wall, and the snap-locking mechanism locks the optical module after the optical module is inserted via the second opening.

Preferably, the locking device comprises at least one locking slot formed at each side wall, and the optical module further comprises a mounting shell having at least one latching member formed thereon, the latching member engages with the locking slot thereby locking the optical module.

Preferably, the optical module comprises a lens assembly having at least one lens, an interconnected assembly including the optical transmitter and the optical receiver and an electrical transmission element, and a supporting assembly supporting the lens assembly and the interconnected assembly.

Preferably, the lens assembly further comprises at least one alignment element for aligning the optical module with the external plug.

Preferably, the optical transmitter and the optical receiver are formed on a mounting plate, and the electrical transmission element connects with the mounting plate and bends over a curves radius.

Preferably, the optical module further comprises a supporting element used to support alignment of the lens assembly to the interconnected assembly and to provide mechanical support for the lens assembly and the interconnected assembly.

Preferably, the supporting assembly comprises a bottom plate and a supporting portion formed thereon, and at least one fixing element for connecting with the lens assembly and the interconnected assembly.

Preferably, the supporting portion includes an arc-shaped plate for supporting the electrical transmission element, thereby reducing the stress of the electrical transmission element.

Preferably, further comprises an individual alignment portion accommodated within the metal shell, and a central channel runs through the alignment portion and communicates with the first opening of the metal shell.

Preferably, the optical transmitter can re-time and reshape the high-speed input driving signal.

Preferably, the optical transmitter and the optical receiver provide a digital diagnostic interface.

Preferably, the optical receiver provides analog optical signal-strength indicator.

Preferably, the optical receiver provides adaptive or static equalization functions to correct dispersion-induced optical signal distortion.

Preferably, the optical receiver provides output electrical signal pre-emphasis to allow the high-speed electrical signal to travel through electrical transmission lines with minimal high-frequency signal degradation.

Preferably, the external plug is optical fiber plug.

In comparison with the prior art, the present invention provides a USB connector body with a metal shell, which comprises a first opening adapted for connecting with an optical fiber plug, and a second opening communicating with the first opening and adapted for accommodating the optical module. The structure of the USB connector is simple, thus the manufacturing cost is decreased, and the connector can further reduce the loss of optical signals and, in turn improve the transmission performance. Moreover, the USB connector is combined with an optical module, which can serve as an optical transceiver also.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 6b is a perspective view of the opto-mechanical element of the optical module shown in FIG. 6a.

DETAILED DESCRIPTION OF ILLUSTRATED EMBODIMENTS

Figure 1:
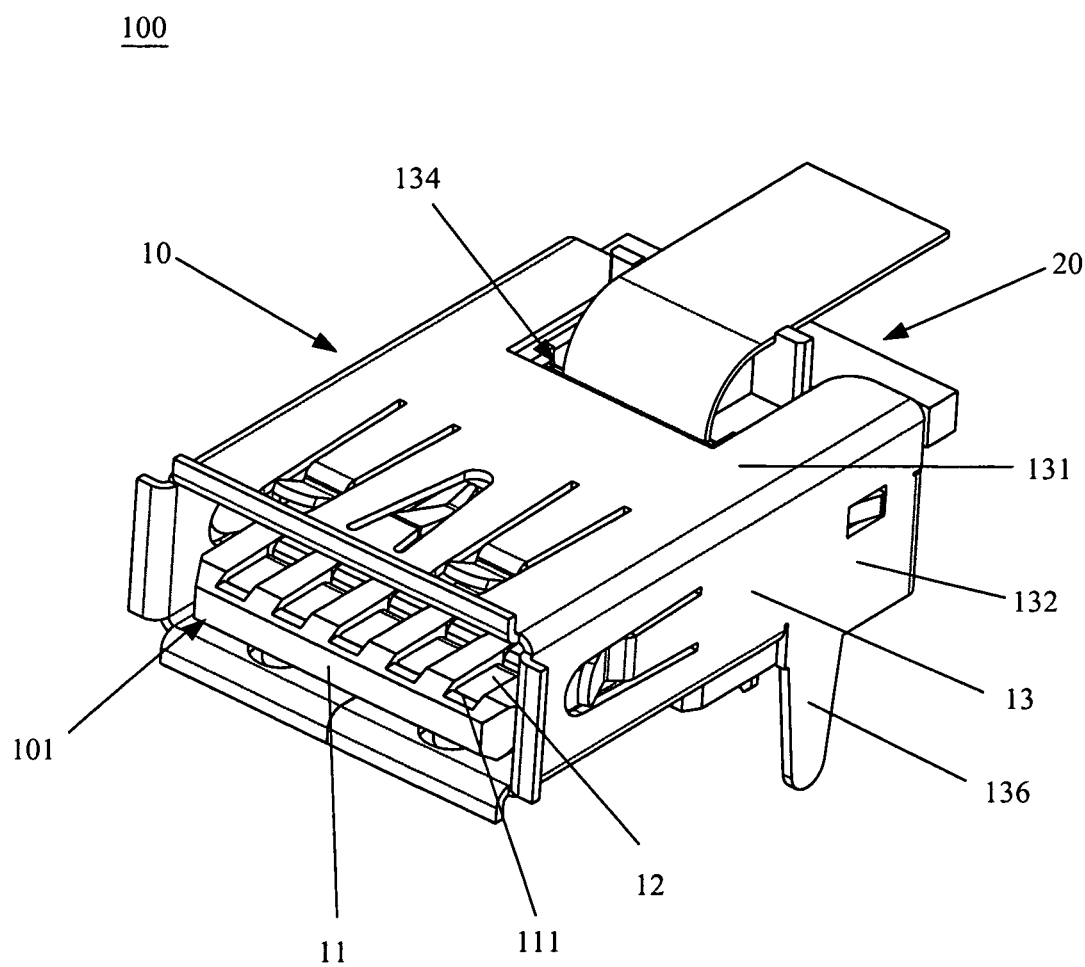
FIG. 1 is a perspective view of a USB connector according to a first embodiment of the present invention.

Various preferred embodiments of the invention will now be described with reference to the figures, wherein like reference numerals designate similar parts throughout the various views. As indicated above, the invention is directed to a USB connector included an optical module, which can be served as not only a USB connector, but also an optical connector, and the present invention can simplify the structure and reduce manufacturing cost, further reduce the loss of optical signals and, in turn improve the transmission performance.

Figure 2:
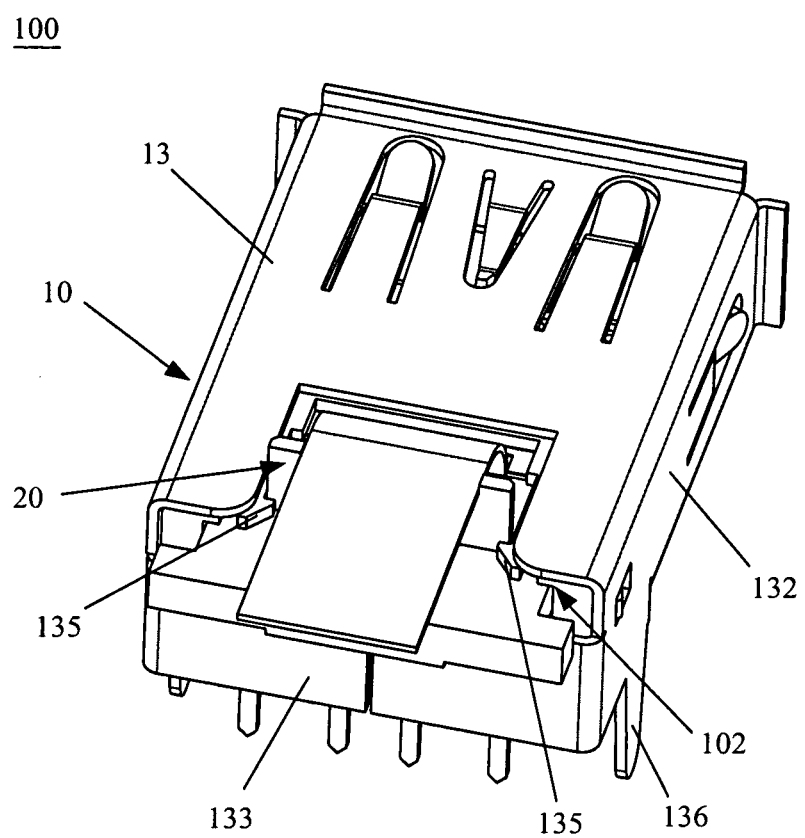
FIG. 2 is another perspective view of the USB connector shown in FIG. 1.

Referring now more particularly to the accompanying drawings, FIGS. 1-2 show a first embodiment of a USB connector of the present invention. As illustrated in FIGS. 1-2, a USB connector 100 includes an USB connector body 10 having a plug-side opening 101 for cooperating with an external plug (not shown), such as an optical fiber plug, and an optical module 20 assembled on the rear portion 102 of the USB connector body 10. Furthermore, the USB connector body 10 includes an insulation body 11, a plurality of conductive terminals 12 and a metal shell 13. A plurality of terminal grooves 111 are formed on the insulation body 11. One end portion of the conductive terminal 12 is accommodated in the terminal groove 111 and the other end portion thereof is soldered to a print circuit board (not shown). And the insulation body 11 is encompassed by the metal shell 13. Specifically, the metal shell 13 is composed of an upper wall 131, two side walls 132, a bottom wall (not shown) and a rear wall 133. An accommodating cavity 134 interconnected with the plug-side opening 101 is formed in the rear portion 102 of the metal shell 13. The optical module 20 is accommodated in the accommodated cavity 134.

As best shown in FIG. 2, a pair of snap-locking mechanism 135 which extends towards the rear end portion 102 of the metal shell 13 is formed in a cantilevered beam-shape on the inner sides of the two side walls 132 of the metal shell 13 for holding the optical module 20. A pair of electrical connection pins 136 extends downwardly from the opposite side walls 132 of the metal shell 13 and is soldered to a printed circuit board (PCB).

Figure 3:
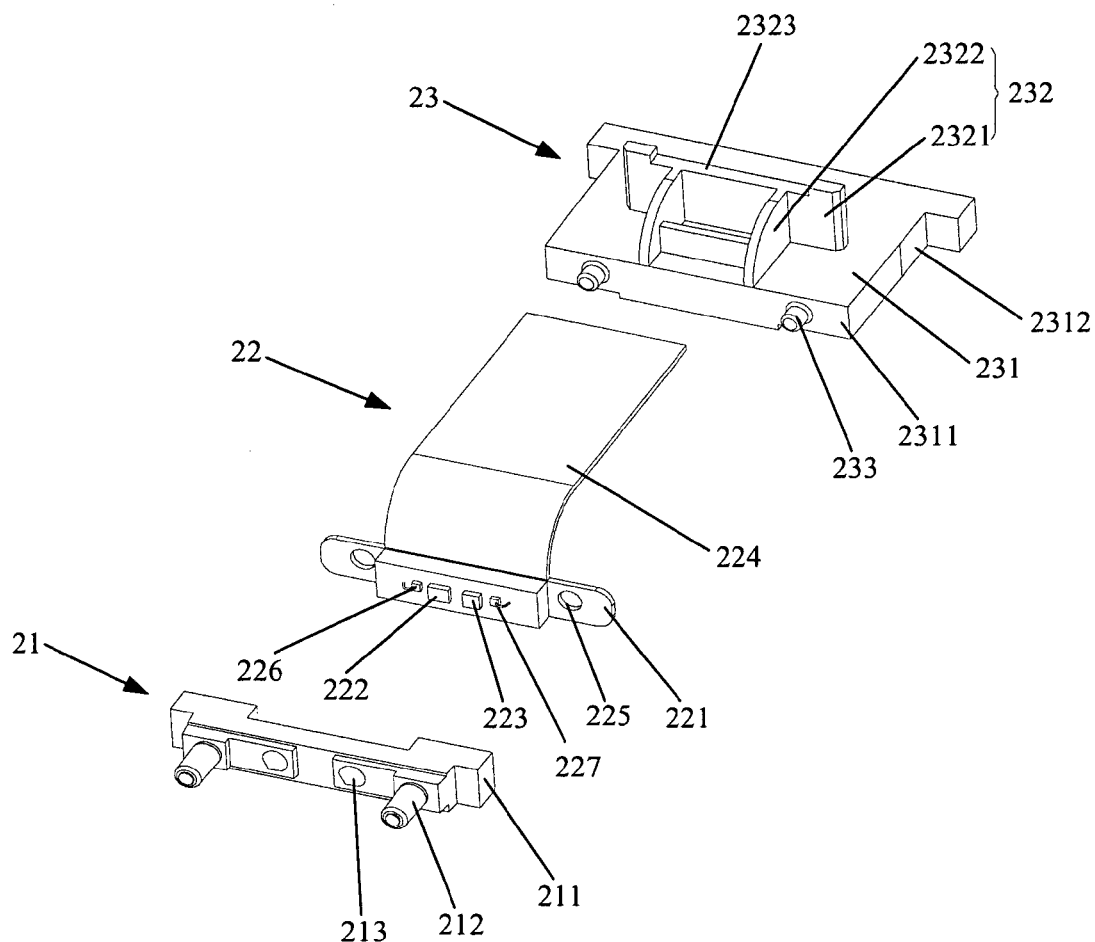
FIG. 3 is an exploded perspective view of the optical module shown in FIG. 1.

FIG. 3 is an exploded perspective view of the optical module 20. As best shown in FIG. 3, the optical module 20 includes a lens assembly 21, an interconnected assembly 22 and a supporting assembly 23 assembled together. The lens assembly 21 further includes a lens base 211, a pair of alignment elements 212 and at least one lens array 213. The pair of alignment elements 212 is symmetrically formed on the opposite ends of the lens base 211 for aligning the optical module 20 with the optical fiber plug. And the lens array 213 is disposed between the pair of the alignment elements 212 for facilitating coupling of optical signal between the optical fiber plug and the optical module 20. Moreover, a pair of mounting slots (not shown) opposite to the pair of the alignment elements 212 is formed on the side of the lens base 211 facing the interconnected assembly 22, which is assembled with one portion of the supporting assembly 23 as described thereinafter.

The interconnected assembly 22 further includes a mounting plate 221, an optical transmitter and an optical receiver mounting on the mounting plate 221, and electrical transmission element 224 electrically connecting with the optical transmitter and optical receiver. Concretely, the optical transmitter includes an optical transmitter integrated circuit (IC) 222 and a light source 226. The optical receiver includes an optical receiver IC 223 and a photodiode 227. The optical transmitter IC 222 and the optical receiver IC 223 are both disposed on the mounting plate 221. The optical transmitter IC 222 is electrically connected to the light source 226. Electrical signal coming from an external IC is fed into the optical transmitter IC 222 and is converted to optical signal by the light source 226. The light source 226 is aligned with one lens of the lens array 213 on the lens assembly 21. Optical signal generated by the light source 226 is focused by the lens array 213 and coupled into optical fiber in an external optical fiber plug. The optical receiver IC 223 is electrically connected to the photodiode 227, which is aligned with another lens on the lens array 213 on the lens assembly 21. Optical signal coming from the optical fiber plug is focused by the lens array 213 and illuminates the photodiode 227. Photocurrent generated by the photodiode 227 is converted into electrical signal suitable for external system by the optical receiver IC 223. One end of the electrical transmission element 224 is formed in the mounting plate 221 and electrically connected to both the optical transmitter IC 222 and the optical receiver IC 223 and the other end thereof is electrically connected to an external IC (not shown) formed on the PCB. Preferably, the light source 226 is a light emitting diode (LED) or a laser. And the electrical transmission element 224 is a flexible printed circuit (FPC). The mounting plate 221 is a rigid PCB. The electrical transmission element 224 and the mounting plate 221 can be integrated together forming a rigid-flex assembly. In addition, a pair of mounting holes 225 is formed in the opposite ends of the mounting plate 221.

The alignment between the lens array 213 of the lens assembly 21 and the light source 226 and the photodiode 227 of the interconnected assembly 22 can be conducted by passive alignment using only a vision system.

The supporting assembly 23 further includes a bottom plate 231 and a supporting portion 232 formed thereon. More specifically, the supporting portion 232 includes a supporting plate 2321 and a pair of arc-shaped plates 2322. The supporting plate 2321 is parallel to the mounting plate 221 and perpendicular to the bottom plate 231. A recess 2323 is formed on the top end of the supporting plate 2321 for holding the electrical transmission element 224. The pair of arc-shaped plates 2322 are parallel to each other and vertically fixed to both the bottom plate 231 and the supporting plate 2321 adapted for supporting the end of the electrical transmission element 224 near the mounting plate 221, thus reducing the stress of the electrical transmission element 224. A pair of fixing elements 233 is formed on the front side 2311 of the bottom plate 231. The fixing element 233 passes through the mounting hole 225 formed on the mounting plate 221 until being fixed into the mounting slot formed on the lens base 211, thus assembling the lens assembly 21, the interconnected assembly 22 and the supporting assembly 23 with each other. The optical module 20 and the USB connector body 10 can be assembled together by aligning and inserting optical module 20 into the accommodating cavity 134 which is held in place by the snap-locking mechanism 135.

Referring to FIGS. 1-3, the operation of the USB connector 100 is described as follows. The optical fiber plug (not shown) transmits an optical signal to one of the lens array 213 aligned with the photodiode 227. The lens array 213 focuses the optical signal to the photodiode 227. Next, the optical receiver IC 223 converts the optical signal into electrical signal and transfer it to an external IC (not shown) formed on the external PCB through the electrical transmission element 224. The external IC (not shown) can send electrical signal to the optical transmitter IC 222 through the electrical transmission element 224. The electrical signal is converted into optical signal via the light source 226. The optical signal generated by light source 226 is focused by one of the lens array 213 and coupled into the optical fiber plug (not shown).

Figure 4:
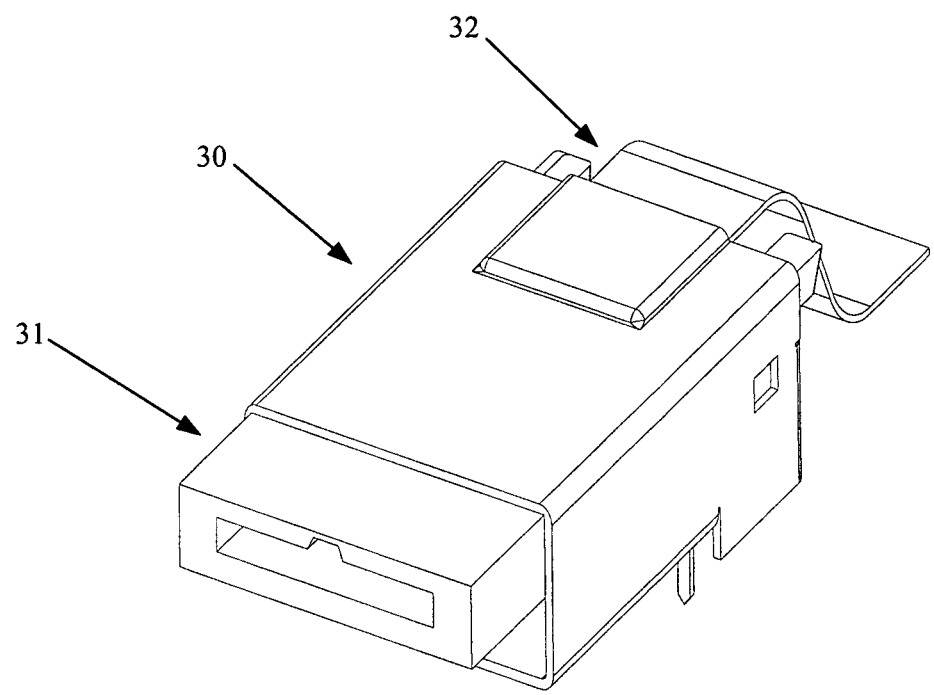
FIG. 4 is a perspective view of a USB connector according to a second embodiment of the present invention.
Figure 5:
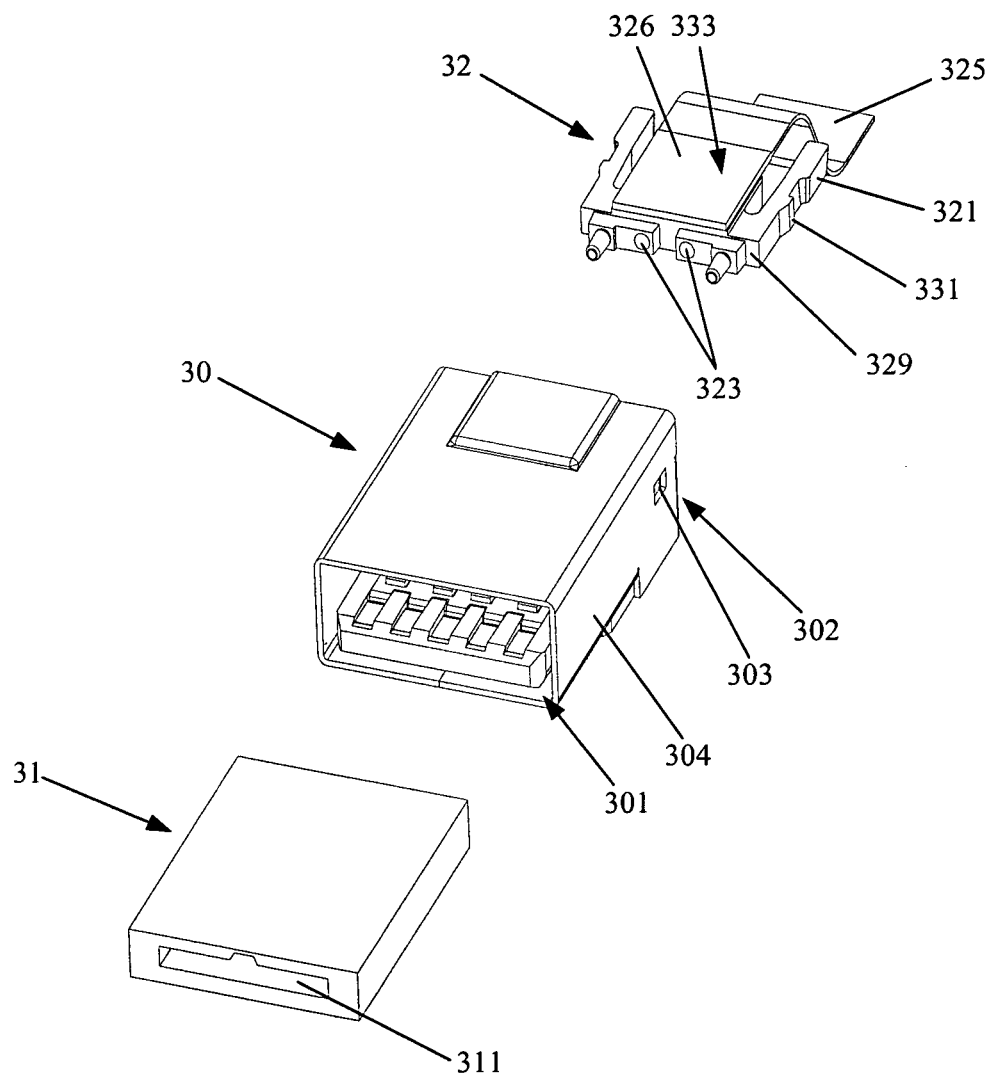
FIG. 5 is a partial exploded perspective view of the USB connector shown in FIG. 4.
Figure 6:
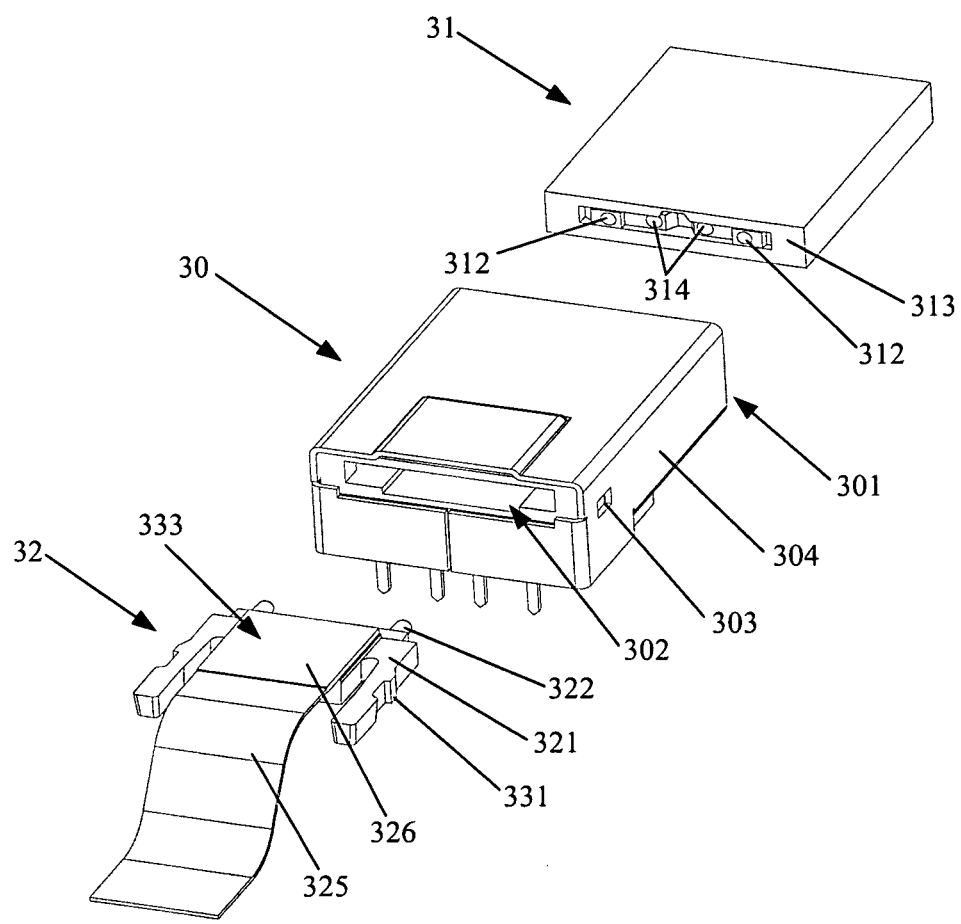
FIG. 6 is another partial exploded perspective view of the USB connector shown in FIG. 4.

FIGS. 4-7 illustrate the detailed structure of a second embodiment of the present invention. Referring to FIGS. 4-6, the USB connector 300 includes the USB connector body 30, an alignment portion 31 and the optical module 32. The structure of the USB connector body 30 is similar to the USB connector body 10 in the first embodiment such that a detailed description of such structure is omitted herefrom. The alignment portion 31 is a detachable structure and is accommodated in the front portion 301 of the USB connector body 30 and the optical module 32 is accommodated in the rear portion 302 of the USB connector body 30.

Figure 7:
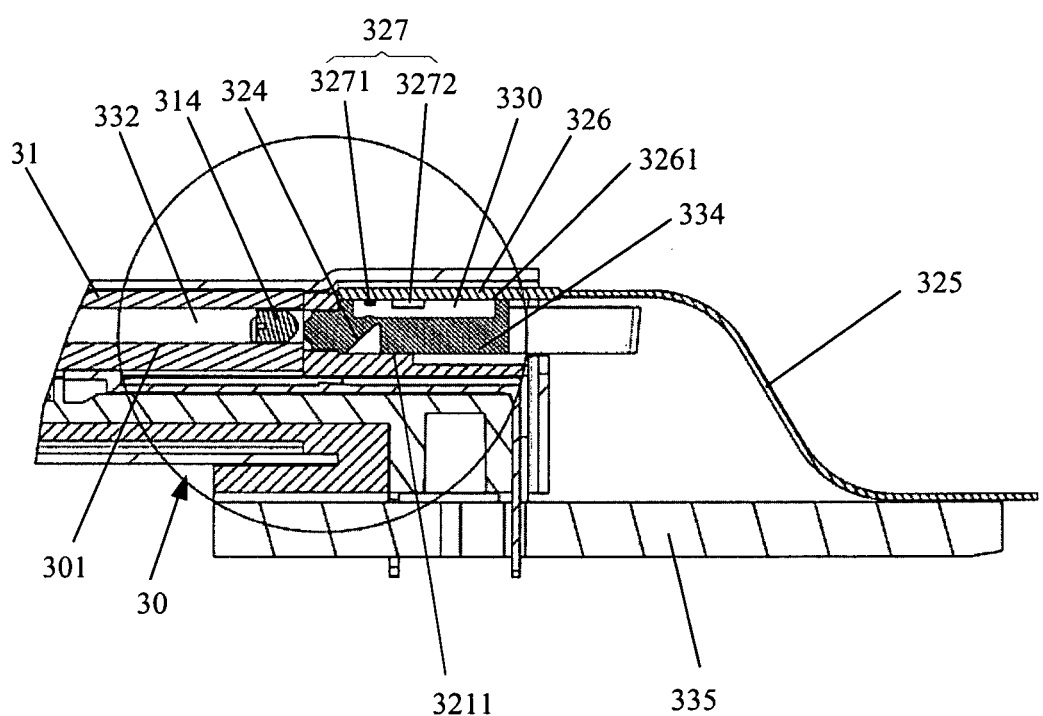
FIG. 7 is a schematic view illustrating the USB connector assembling with a printed circuit board and an optical fiber plug.

Specifically, a central channel 311 runs through the alignment portion 31 and is used to cooperate with the optical fiber plug 332 (shown in FIG. 7). A pair of alignment holes 312 is formed on the rear end 313 of the alignment portion 31. A lens array 314 can be optionally formed between the two alignment holes 312.

Referring to FIGS. 5, 6, 6a, 6b and 7, the optical module 32 includes an opto-mechanical element 321 and an electrical sub-assembly 333. The opto-mechanical element 321 is composed of several parts molded thereon. These parts include a pair of alignment elements 322, a lens array 323, a reflecting surface 324, a pair of latching members 331 and a cavity 330 for housing the active optical and electronics components. The opto-mechanical element 321 is formed using thermal plastic material which is transparent or exhibit little absorption to the wavelengths of the light source used in the module. The pair of alignment elements 322 is symmetrically formed on the front side 329 of the opto-mechanical element 321 for aligning with the pair of alignment holes 312 formed on the alignment portion 31, thus aligning the optical module 32 with the optical fiber plug 332. And the lens array 323 is symmetrically disposed between the pair of alignment elements 322 for focusing the optical signal coming from the optical fiber plug 332. A pair of latching members 331 is formed on the opposite sides of the opto-mechanical element 321. A pair of locking slots 303 is formed in the opposite side walls 304 of the USB connector body 30. The optical module 32 and the USB connector body 30 are assembled together by aligning and engaging the pair of latching members 331 and the pair of locking slots 303.

Figure 6A:
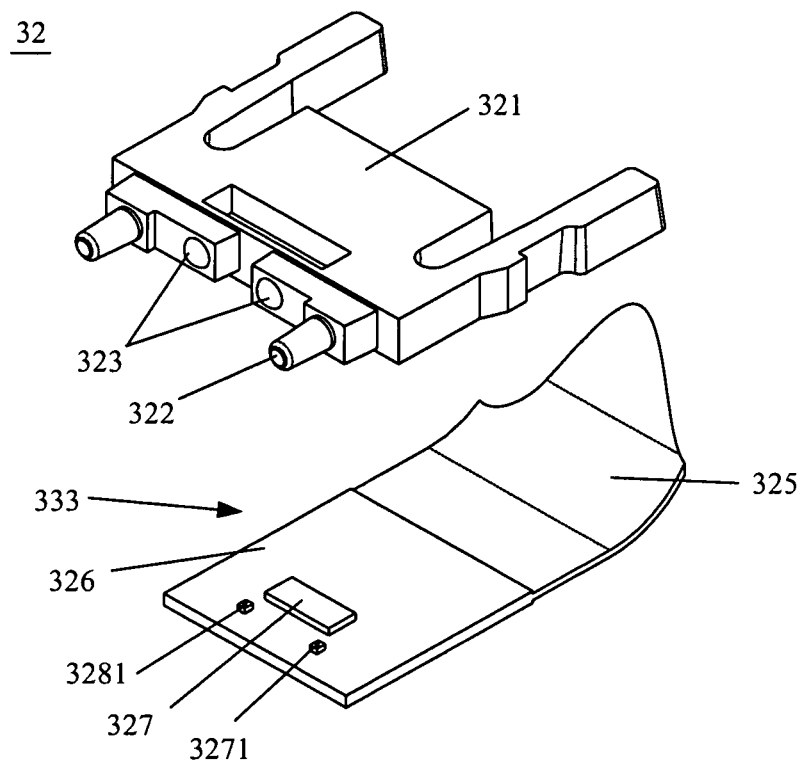
FIG. 6a is an exploded view of the optical module shown in FIG. 5.
Figure 6B:
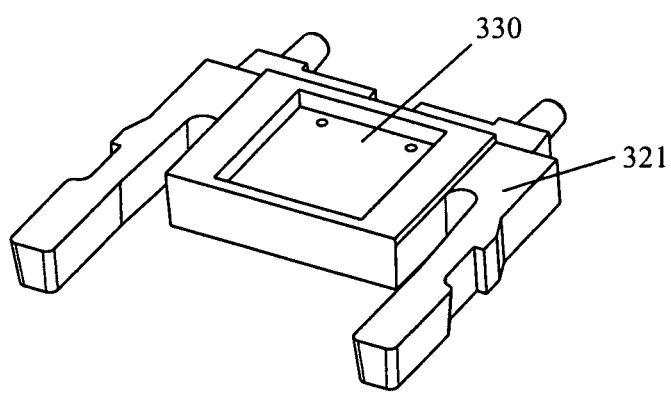

Concretely, as shown in FIGS. 6a, 6b and 7, the electrical sub-assembly 333 is composed of an electrical transmission element 325, a substrate 326, an optical transceiver IC 327, an optical light source 3281 and a photodiode 3271. The optical transceiver IC 327 contains a transmitter portion and a receiver portion. It is possible that the optical transceiver IC 327 is separated into two discrete IC's in an alternative implementation. The substrate 326 is disposed on the top side of the opto-mechanical element 321 and covers the cavity 330. The optical transceiver IC 327, light source 3281 and photodiode 3271 are disposed on the inner side 3261 of the substrate 326 in such a way that all these elements are housed within the cavity 330 of the opto-mechanical element 321. One end of the electrical transmission element 325 is integrated with the substrate 326 and the other end thereof is electrically connected to the integrated circuit (not shown) formed on the PCB 335. More concretely, the optical transceiver IC 327 is electrically connected to the light source 3281 and photodiode 3271 through conductive connections on substrate 326. The reflecting surface 324 is disposed on the bottom 3211 of the opto-mechanical element 321 and under the light source 3281 and the photodiode 3271. And the reflecting surface 324 faces to the central channel 311 of the alignment portion 31, the light source 3281 and the photodiode 3271 for reflecting the optical signal coming from the receiving fiber in the optical fiber plug 332 to the optical receiver and from the light source to the transmitting fiber in the optical fiber plug 332. Preferably, the slope angle of the reflecting surface 324 is 45 degree. Reflection on the reflecting surface 324 can be achieved by either reflective coating or utilizing total internal reflection (TIR). The light source 3281 can be either a LED or a laser.

Referring to FIGS. 4-7, the operation of the USB connector 300 is described as follows. Optical signal carried by the receiving fiber in the optical fiber plug 332 is collimated by one of the lenses in the lens array 323. The beam is reflected by the reflecting surface 324 towards the photodiode 3271. The photodiode 3271 converts the optical signal into electrical signal which is amplified by the receiver portion of the transceiver IC 327, and transmitted to the external IC (not shown) formed on the PCB 335 through the electrical transmission element 325. When the external IC sends an electrical signal to the transceiver IC through the electrical transmission element 325, the transmitter portion of transceiver IC 327 converts the received electrical signal into appropriate driving signal to modulate the light source of the optical transmitter which generates the optical signal accordingly. The optical signal is reflected to one of the lens on the lens array 323 through the reflecting element 324. Finally, the optical signal is coupled into the transmitting fiber within the optical fiber plug 332 by the pair of lens array 323.

More specifically, the optical transceiver IC 327 may provide digital diagnostic interface for external system to communicate and monitor the transceiver module. The optical transceiver IC 327 may also provide programmability for light source of the optical transmitter in terms of modulation and bias current settings over temperature. Moreover, the optical transmitter may also re-time and re-shape the high-speed input driving signal that is transmitted through the electrical transmission element 325 so as to equalize and compensate the timing jitter and distortion of the input signal. In addition, the receiver portion of the optical transceiver IC 327 may provide an analog optical signal-strength indicator and may be capable of providing adaptive or static equalization functions to correct dispersion-induced optical signal distortion. Furthermore, the optical receiver electrical output may provide output electrical signal pre-emphasis to allow the high-speed electrical signal to travel through FPC and PCB transmission lines with minimal amplitude and timing degradation.

Compared with the prior art, the present invention combines a USB connector with an optical module, thus the present invention can served as not only a USB connector, but also an active optical transceiver. Moreover, since the optical module is directly engaged with the USB connector body, and connected to the external optical fiber, without jumper cable connection, thus the structure of the USB connector is simplified, and the manufacturing cost is reduced, and further the loss of optical signals is reduced, finally the transmission performance of the USB connector is improved.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A universal serial bus connector, comprising a universal serial bus connector body and an optical module including an optical transmitter and an optical receiver and engaging with the universal serial bus connector body, wherein the universal serial bus connector body comprises a metal shell having:
   a first opening adapted for connecting with an external plug;
   a second opening communicating with the first opening and adapted for accommodating the optical module; and
   a locking device adapted for locking the optical module within the universal serial bus connector body;
   wherein the optical module comprises a lens assembly having at least one lens, an interconnected assembly including the optical transmitter, the optical receiver and an electrical transmission element; and
   wherein the optical transmitter and the optical receiver are formed on a mounting plate, and the electrical transmission element is connected with the mounting plate and bent over a curves radius.

2. The universal serial bus connector according to claim 1, wherein the universal serial bus connector body further comprises an insulation body and a plurality of conductive terminals formed within the metal shell, and the metal shell further comprises an upper wall, two side walls and a bottom wall.

3. The universal serial bus connector according to claim 2, wherein the first opening is formed at a front portion of the metal shell, and the second opening opposite to the first opening is formed at a rear portion of the metal shell.

4. The universal serial bus connector according to claim 2, wherein the metal shell further comprises a rear wall, the first opening is formed at a front portion of the metal shell, and the second opening is formed at the upper wall and at least partially extends to the rear wall.

5. The universal serial bus connector according to claim 4, wherein the locking device comprises at least one snap-locking mechanism formed at a position of the upper wall which is near the rear wall, and the snap-locking mechanism locks the optical module after the optical module is inserted via the second opening.

6. The universal serial bus connector according to claim 2, wherein the locking device comprises at least one locking slot formed at each side wall, and the optical module further comprises a mounting shell having at least one latching member formed thereon, the latching member engages with the locking slot thereby locking the optical module.

7. The universal serial bus connector according to claim 1, wherein the lens assembly further comprises at least one alignment element for aligning the optical module with the external plug.

8. The universal serial bus connector according to claim 1, wherein the optical module further comprises a supporting element used to support alignment of the lens assembly to the interconnected assembly and to provide mechanical support for the lens assembly and the interconnected assembly.

9. The universal serial bus connector according to claim 8, wherein the supporting assembly comprises a bottom plate, a supporting portion formed thereon, and at least one fixing element for connecting with the lens assembly and the interconnected assembly.

10. The universal serial bus connector according to claim 8, wherein the supporting portion includes an arc-shaped plate for supporting the electrical transmission element, thereby reducing the stress of the electrical transmission element.

11. The universal serial bus connector according to claim 1, wherein the optical transmitter can re-time and re-shape the high-speed input driving signal.

12. The universal serial bus connector according to claim 1, wherein the optical transmitter and the optical receiver provide a digital diagnostic interface.

13. The universal serial but connector according to claim 1, wherein the optical receiver provides analog optical signal-strength indicator.

14. The universal serial bus connector according to claim 1, wherein the optical receiver provides adaptive or static equalization functions to correct dispersion-induced optical signal distortion.

15. The universal serial bus connector according to claim 1, wherein the optical receiver provides output electrical signal pre-emphasis to allow the high-speed electrical signal to travel through electrical transmission lines with minimal high-frequency signal degradation.

16. The universal serial bus connector according to claim 1, wherein the external plug is optical fiber plug.

17. A universal serial bus connector, comprising a universal serial bus connector body and an optical module including an optical transmitter and an optical receiver and engaging with the universal serial bus connector body, wherein the universal serial bus connector body comprises a metal shell having:
- a first opening adapted for connecting with an external plug;
- a second opening communicating with the first opening and adapted for accommodating the optical module; and
- a locking device adapted for locking the optical module within the universal serial bus connector body,
- wherein the optical module comprises a lens assembly having at least one lens, an interconnected assembly including the optical transmitter, the optical receiver and an electrical transmission element,
- wherein the optical module further comprises a supporting element used to support alignment of the lens assembly to the interconnected assembly and to provide mechanical support for the lens assembly and the interconnected assembly, and
- wherein the supporting assembly comprises a bottom plate, a supporting portion formed thereon, and at least one fixing element for connecting with the lens assembly and the interconnected assembly.

18. A universal serial bus connector, comprising a universal serial bus connector body and an optical module including an optical transmitter and an optical receiver and engaging with the universal serial bus connector body, wherein the universal serial bus connector body comprises a metal shell having:
- a first opening adapted for connecting with an external plug;
- a second opening communicating with the first opening and adapted for accommodating the optical module; and
- a locking device adapted for locking the optical module within the universal serial bus connector body,
- wherein the optical module comprises a lens assembly having at least one lens, an interconnected assembly including the optical transmitter, the optical receiver and an electrical transmission element,
- wherein the optical module further comprises a supporting element used to support alignment of the lens assembly to the interconnected assembly and to provide mechanical support for the lens assembly and the interconnected assembly, and
- wherein the supporting portion includes an arc-shaped plate for supporting the electrical transmission element, thereby reducing the stress of the electrical transmission element.

* * * * *